(12) United States Patent
Li et al.

(10) Patent No.: US 9,910,218 B2
(45) Date of Patent: Mar. 6, 2018

(54) OPTICAL MODULE AND OPTICAL NETWORK SYSTEM

(71) Applicant: Huawei Technologies Co., Ltd., Shenzhen, Guangdong (CN)

(72) Inventors: Shu Li, Shenzhen (CN); Cong Chen, Shenzhen (CN); Sulin Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 92 days.

(21) Appl. No.: 14/757,746

(22) Filed: Dec. 23, 2015

(65) Prior Publication Data

US 2016/0124146 A1     May 5, 2016

Related U.S. Application Data

(63) Continuation of application No. PCT/CN2013/077811, filed on Jun. 24, 2013.

(51) Int. Cl.
    *H04B 10/40*     (2013.01)
    *G02B 6/12*     (2006.01)
    (Continued)

(52) U.S. Cl.
    CPC ........... *G02B 6/12004* (2013.01); *G02B 6/42* (2013.01); *H04Q 11/0067* (2013.01);
    (Continued)

(58) Field of Classification Search
    CPC ....... H04Q 11/0067; H04Q 2011/0016; H04Q 2011/0049; G02B 6/42; G02B 6/12004;
    (Continued)

(56) References Cited

U.S. PATENT DOCUMENTS 4,790,615 A * 12/1988 Seki ................... G02B 6/12007
                                                           359/885
5,825,951 A * 10/1998 Kitamura ............. G02B 6/4246
                                                           385/42

(Continued)

FOREIGN PATENT DOCUMENTS

CN          2634495 Y      8/2004
CN        201114095 Y      9/2008

(Continued)

OTHER PUBLICATIONS

S. Kaneko, et al., "Low-Crosstalk Hybrid-Integrated Optical Transceiver Module Using a Polymer PLC Chip and a MMF Stub", IEEE Photonics Technology Letters, vol. 13, No. 8, Aug. 2001, p. 866-868.

*Primary Examiner* — Ken N Vanderpuye
*Assistant Examiner* — Dibson Sanchez

(57) ABSTRACT

The present invention provides an optical module and an optical network system. A first chip is arranged on a lower cover plate, an upper cladding, which is close to a first PD, of the first chip is covered by a first upper cover plate; a first dividing groove divides the first chip into two parts, and a WDM and a light blocking material are arranged inside the first dividing groove, so as to block stray light transmitted inside the upper cladding, a sandwich layer, a lower cladding, and a base of the first chip; and a light blocking material is arranged on a side of the first upper cover plate facing the first LD, so as to block stray light transmitted on a surface of the first chip, thereby blocking the stray light that enters the first PD, and significantly reducing crosstalk of the optical module.

10 Claims, 5 Drawing Sheets

(51) Int. Cl.
*H04Q 11/00* (2006.01)
*G02B 6/42* (2006.01)

(52) U.S. Cl.
CPC ...... *G02B 6/4286* (2013.01); *G02B 2006/121* (2013.01); *G02B 2006/12109* (2013.01); *G02B 2006/12121* (2013.01); *G02B 2006/12123* (2013.01); *G02B 2006/12126* (2013.01); *G02B 2006/12164* (2013.01); *H04Q 2011/0016* (2013.01); *H04Q 2011/0049* (2013.01)

(58) Field of Classification Search
CPC ........... G02B 2006/12164; G02B 2006/12126; G02B 2006/12123; G02B 2006/12109; G02B 2006/121; G02B 6/4286; G02B 2006/12121
USPC .................................................. 398/135–139
See application file for complete search history.

(56) References Cited

U.S. PATENT DOCUMENTS

| | | | | |
|---|---|---|---|---|
| 5,960,135 A * | 9/1999 | Ozawa | ................. | G02B 6/4246 385/14 |
| 6,085,000 A * | 7/2000 | Tanaka | ................. | G02B 6/12007 385/45 |
| 6,215,917 B1 * | 4/2001 | Takahashi | .............. | H04B 10/40 385/14 |
| 6,264,377 B1 * | 7/2001 | Mitsuda | ................. | G02B 6/4246 257/E33.067 |
| 6,385,375 B1 * | 5/2002 | Goto | ................... | G02B 6/4246 385/49 |
| 6,408,121 B1 * | 6/2002 | Goto | ................. | G02B 6/12007 385/129 |
| 6,480,647 B1 * | 11/2002 | Kitamura | ............. | G02B 6/4204 385/24 |
| 6,527,454 B1 * | 3/2003 | Saito | ................... | G02B 6/4246 385/45 |
| 6,546,171 B2 | 4/2003 | Fukutomi | | |
| 6,735,366 B2 | 5/2004 | Goto | | |
| 6,868,210 B2 * | 3/2005 | Takahashi | ........... | G02B 6/4246 359/333 |
| 7,181,098 B2 | 2/2007 | Kwon et al. | | |
| 7,284,903 B2 * | 10/2007 | Hartog | .................. | G01K 11/32 356/337 |
| 7,409,124 B2 * | 8/2008 | Tsai | ..................... | G02B 6/4246 385/49 |
| 7,492,992 B1 | 2/2009 | Tyan et al. | | |
| 8,953,913 B2 * | 2/2015 | Guattari | ................. | G02B 6/122 385/14 |
| 9,264,435 B2 * | 2/2016 | Liu | ........................ | H04L 63/10 |
| 9,612,410 B2 * | 4/2017 | Oguro | ................... | G02B 6/4206 |
| 2001/0002942 A1 * | 6/2001 | Fukutomi | ............ | G02B 6/4257 385/92 |
| 2001/0033716 A1 | 10/2001 | Fukutomi | | |
| 2001/0053262 A1 * | 12/2001 | Kinoshita | .......... | G02B 6/12007 385/24 |
| 2002/0001427 A1 | 1/2002 | Hashimoto et al. | | |
| 2002/0027230 A1 | 3/2002 | Terada et al. | | |
| 2002/0031307 A1 * | 3/2002 | Kimura | .............. | G02B 6/29385 385/49 |
| 2002/0048431 A1 * | 4/2002 | Kimura | .............. | G02B 6/12007 385/47 |
| 2002/0097963 A1 * | 7/2002 | Ukechi | .............. | G02B 6/29368 385/50 |
| 2003/0059178 A1 * | 3/2003 | Kobayashi | ........... | G02B 6/4246 385/94 |
| 2003/0198441 A1 | 10/2003 | Goto | | |
| 2003/0202750 A1 * | 10/2003 | Okada | .................. | G02B 6/4246 385/49 |
| 2003/0231840 A1 * | 12/2003 | Okada | .................. | G02B 6/4246 385/92 |
| 2004/0247230 A1 | 12/2004 | Kwon et al. | | |
| 2004/0247247 A1 * | 12/2004 | Lee | ....................... | G02B 6/4246 385/49 |
| 2005/0084217 A1 * | 4/2005 | Yoshimura | ........... | G02B 6/4206 385/88 |
| 2005/0100273 A1 * | 5/2005 | Kim | ................... | G02B 6/12007 385/24 |
| 2005/0123241 A1 * | 6/2005 | Margalit | ............. | G02B 6/12004 385/39 |
| 2006/0110094 A1 | 5/2006 | Bachl et al. | | |
| 2006/0140546 A1 * | 6/2006 | Nakata | .................... | G02B 6/136 385/88 |
| 2007/0189660 A1 * | 8/2007 | Sugimoto | .......... | G02B 6/29368 385/14 |
| 2007/0286549 A1 * | 12/2007 | Warashina | ........... | G02B 6/4246 385/33 |
| 2008/0037927 A1 | 2/2008 | Kurihara et al. | | |
| 2008/0181611 A1 * | 7/2008 | Chida | .................. | G02B 6/4246 398/79 |
| 2008/0247766 A1 * | 10/2008 | McCaul | .............. | H04B 10/693 398/202 |
| 2009/0041072 A1 * | 2/2009 | Oguro | ................... | G02B 6/4206 372/29.021 |
| 2009/0129427 A1 * | 5/2009 | Ariga | .................. | H01S 5/02208 372/108 |
| 2010/0135619 A1 * | 6/2010 | Choi | ................... | G02B 6/12007 385/88 |
| 2011/0268450 A1 | 11/2011 | Paslaski et al. | | |
| 2013/0108274 A1 | 5/2013 | Zhang | | |
| 2016/0170156 A1 * | 6/2016 | Oguro | ................... | G02B 6/4246 385/14 |

FOREIGN PATENT DOCUMENTS

| | | |
|---|---|---|
| CN | 102356573 A | 2/2012 |
| CN | 102714556 A | 10/2012 |
| EP | 0929108 A2 | 7/1999 |
| JP | 08086929 A | 4/1996 |
| JP | 11-202140 | 7/1999 |
| JP | 2000180646 A | 6/2000 |
| JP | 2001-174675 A | 6/2001 |
| JP | 2003255167 A | 9/2003 |
| JP | 2004045901 A | 2/2004 |
| JP | 2007-187793 A | 7/2007 |
| JP | 2010-060653 A | 3/2010 |

* cited by examiner

OPTICAL MODULE AND OPTICAL NETWORK SYSTEM

CROSS-REFERENCE TO RELATED APPLICATION

This application is a continuation of International Application No. PCT/CN2013/077811, filed on Jun. 24, 2013 which is hereby incorporated by reference in its entirety.

TECHNICAL FIELD

The present invention relates to the field of communications technologies, and in particular, to an optical module and an optical network system.

BACKGROUND

With the constant growth of the bandwidth demand, the optical communication network achieves a huge application advantage from the transmission field to the access field. Because of the broad distribution of the optical communication network, a large number of optical communication modules are used inevitably. To further reduce the optical module cost in the network, the industry proposed using the PLC technology to replace the conventional free-space optical module. FIG. 1 shows a main structure of a typical PLC optical module. Generally, as same with the free-space optical module, a single PLC optical module structure needs to include a sending unit (LD) and a receiving unit (PD), and the difference lies in that optical signals are transmitted through a waveguide. The optical module sends light (solid arrow) or receives light (dotted arrow) to the communication network through a network interface, where light of two different wavelengths is used. Because of existence of the light of different wavelengths, a WDM component is required to make the distinction. Generally, the WDM component may reflect light of a certain band, and transmit light of another band.

In the structure of the PLC optical module shown in FIG. 1, because coupling efficiency between a laser and waveguide is limited, a part of light may spread out of the waveguide in a form of stray light. This part of light enters the receiver, and will have an adverse impact on performance of the receiver and cause crosstalk, thereby leading to deterioration of the performance of the entire optical module.

SUMMARY

The objective of the embodiments of the present invention is to provide an optical module to solve the crosstalk problem of the optical module.

In a first aspect, an optical module is provided, including a first chip, a first LD, and a first PD arranged opposite to the first LD. The first chip includes a base, a lower cladding, a sandwich layer having multiple waveguide cores, and an upper cladding. The first chip is arranged on a lower cover plate through the base, and the upper cladding thereof close to the first PD is covered by a first upper cover plate. The first chip is divided into two parts by the first dividing groove. A WDM and a light blocking material are arranged inside the first dividing groove, and a light blocking material is arranged on a side of the first upper cover plate facing the first LD.

With reference to the first aspect, in a first possible implementation, the first dividing groove cuts through the upper cladding, the sandwich layer, the lower cladding, and the base, to an upper surface of the lower cover plate, where the WDM is arranged in a middle part of the first dividing groove, and the remaining part of the first dividing groove is filled with the light blocking material.

With reference to the first aspect or the first possible implementation of the first aspect, in a second possible implementation, the first dividing groove obliquely intersects with a cross section of the first chip, the WDM is arranged at a side end of the first dividing groove, and the remaining part of the first dividing groove is filled with the light blocking material. A waveguide core coupled with the first PD is a straight waveguide core, and the straight waveguide core is perpendicular to the cross section of the first chip.

With reference to the second possible implementation of the first aspect, in a third possible implementation, the upper cladding, which is close to the first LD, of the first chip is covered by a second upper cover plate, and the light blocking material is arranged on a side of the second upper cover plate facing the first PD.

With reference to the third possible implementation of the first aspect, in a fourth possible implementation, the optical module further includes a second PD close to the first LD, and an optical axis of the second PD is perpendicular to an optical axis of the first LD. A second dividing groove filled with a light blocking material is arranged between the second PD and the first LD, and the second dividing groove runs through the second upper cover, the upper cladding, the sandwich layer, the lower cladding, and the base from top to bottom, to an upper surface of the lower cover plate.

With reference to the fourth possible implementation of the first aspect, in a fifth possible implementation, the optical module further includes a second LD. The second LD and the first PD are located at a same side end of the first chip, and both optical axes are parallel to each other. A third dividing groove filled with a light blocking material is arranged between the second LD and the first PD, and the third dividing groove runs through the first upper cover plate, the upper cladding, the sandwich layer, the lower cladding, and the base from top to bottom, to the upper surface of the lower cover plate.

In a second aspect, an optical network system is provided, including an optical line terminal, an optical distribution network, and optical network units. The optical line terminal is connected to each optical network unit through the optical distribution network. The optical line terminal and/or the optical network unit adopts the optical module.

In the embodiments of the present invention, the first chip is arranged on the lower cover plate, and the upper cladding, which is close to the first PD, of the first chip is covered by the first upper cover plate. The first dividing groove divides the first chip into two parts, and the WDM and the light blocking material are arranged inside the first dividing groove, so as to block stray light transmitted inside the upper cladding, the sandwich layer, the lower cladding, and the base of the first chip, and the light blocking material is arranged on the side of the first upper cover plate facing the first LD, so as to block stray light transmitted on a surface of the first chip, thereby blocking the stray light that enters the first PD, and significantly reducing crosstalk of the optical module. Further, the PLC optical module has a simple structure, and therefore is easy to manufacture at a low cost.

DETAILED DESCRIPTION

To make the objectives, technical solutions, and advantages of the present invention more comprehensible, the following further describes the present invention in detail with reference to the accompanying drawings and embodiments. It should be understood that the specific embodiments described herein are merely used for describing the present invention, but are not intended to limit the present invention.

In the embodiments of the present invention, a first chip is arranged on a lower cover plate, and an upper cladding, which is close to the first PD, of the first chip is covered by a first upper cover plate, a first dividing groove divides the first chip into two parts, and a WDM and a light blocking material are arranged inside the first dividing groove, so as to block stray light transmitted inside the upper cladding, a sandwich layer, a lower cladding, and a base of the first chip, and the light blocking material is arranged on the side of the first upper cover plate facing the first LD, so as to block stray light transmitted on a surface of the first chip, thereby blocking the stray light that enters the first PD, and significantly reducing crosstalk of the optical module. Further, the PLC optical module has a simple structure, and therefore is easy to manufacture at a low cost.

The implementation of the present invention is described in detail by taking a PLC optical module as an example.

Embodiment 1

Figure 1:
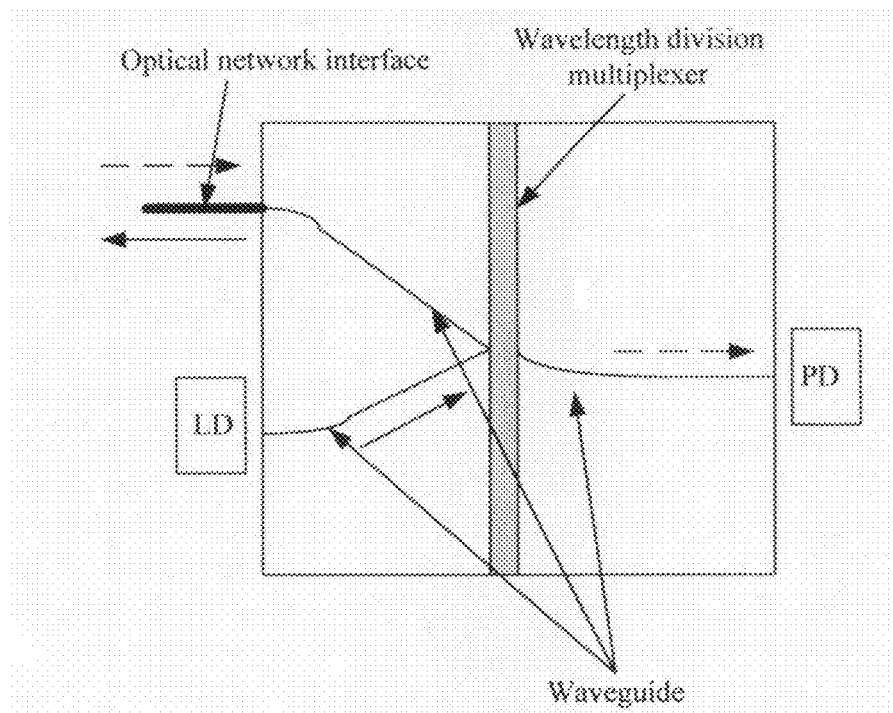
FIG. 1 is a schematic structural diagram of a PLC optical module.
Figure 2:
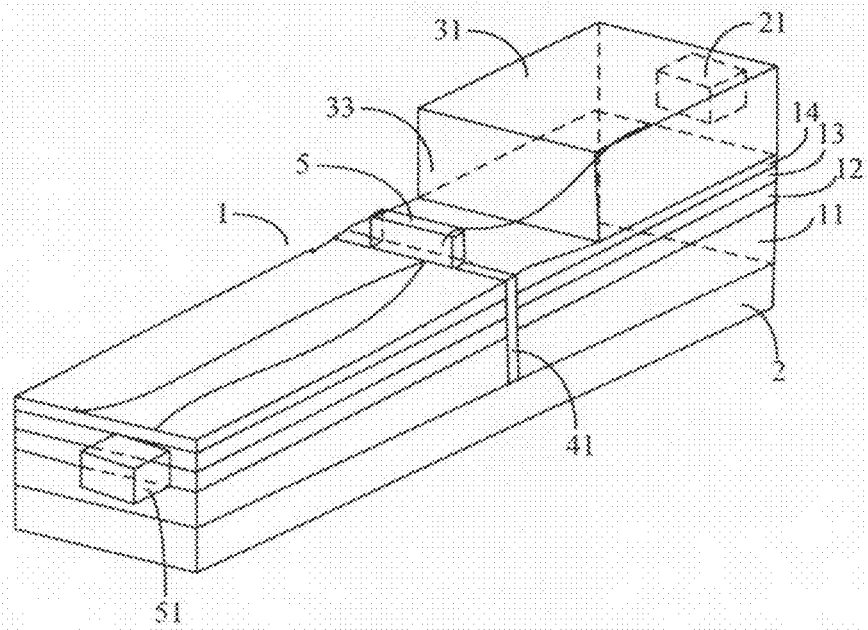
FIG. 2 is a schematic plan view of a PLC optical module according to Embodiment 1 of the present invention.
Figure 3:
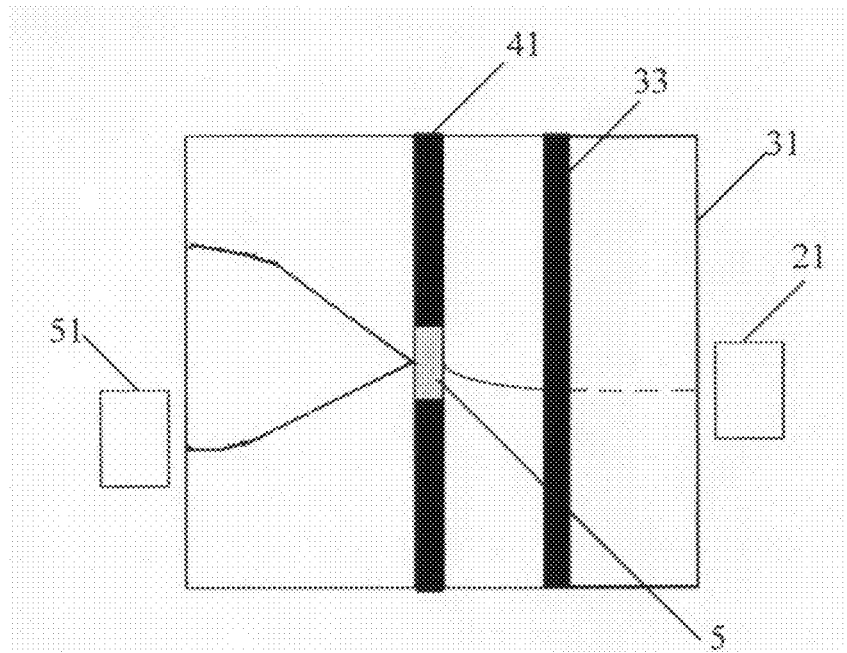
FIG. 3 is a schematic plan view of the PLC optical module according to the Embodiment 1 of the present invention.

As shown in FIGS. 2 and 3, an optical module provided in the embodiment of the present invention includes a first chip 1, a first Laser diode (LD) 51 and a first Photo diode (PD) 21 arranged opposite to the first LD 51. The PLC chip 1 includes a base 11, a lower cladding 12, a sandwich layer 13 and an upper cladding 14, where multiple waveguide cores are arranged inside the sandwich layer 13. The first chip 1 is arranged on a lower cover plate 2 through the base 11, the upper cladding close to the first PD 11 is covered by a first upper cover plate 31, and a first dividing groove 41 divides the first chip 1 into two parts. A Wavelength division multiplexer (WDM) 5 and a light blocking material is arranged inside the first dividing groove 41. A light blocking material is arranged on a side 33 of the first upper cover plate 31 facing the first LD 51. The first chip may be a Planar light-wave circuit (PLC) chip, and the optical module may be a PLC optical module. In this way, the light blocking material arranged inside the first dividing groove 41 may block stray light transmitted in the upper cladding 14, sandwich layer 13, lower cladding 12, and base 11 of the first chip, and the light blocking material arranged on the first upper cover plate 31 may block stray light transmitted on a surface of the PLC chip 1, thereby blocking stray light that enters the first PD 21, and significantly reducing crosstalk of the optical module. Further, the PLC optical module has a simple structure, and therefore is easy to manufacture at a low cost.

The first dividing groove 41 cuts through the upper cladding 14, the sandwich layer 13, the lower cladding 12, and the base 11, to an upper surface of the lower cover plate 2. The entire first chip 1 may be cut through by adopting a photoetching method, to form the first dividing groove 41 parallel to a cross section of the first chip. The WDM 5 herein is arranged in a middle part of the first dividing groove 41, and the remaining part of the first dividing groove 41 is filled with a light blocking material (for example, black adhesive), to block stray light from transmitting at both sides of the WDM 5, thereby further reducing crosstalk of the optical module.

Description is made below by using the PLC optical module as the optical module and the PLC chip as the first chip, but this is not the unique embodiment. The optical module may be an optical module of another type, and the chip may also be a chip of another type.

Embodiment 2

Figure 4:
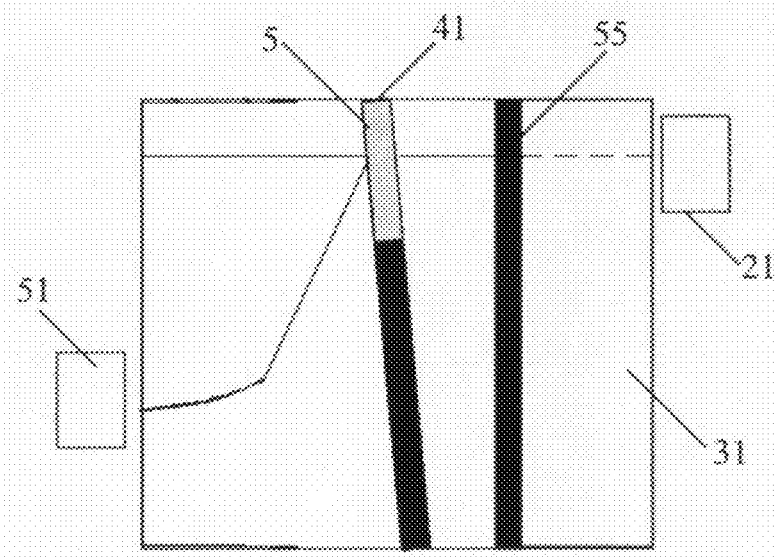
FIG. 4 is a schematic plan view of a PLC optical module according to a Embodiment 2 of the present invention.

As shown in FIG. 4, the difference from Embodiment 1 lies in that the first dividing groove 41 in this embodiment obliquely intersects with the cross section of the PLC chip 1. The WDM 5 herein is arranged at a side end of the first dividing groove 41, and the remaining part of the first dividing groove 41 is filled with the light blocking material. That is, the light blocking material is provided only on one side of the first dividing groove 41. Therefore, it is convenient to fill the light blocking material, and to manufacture the PLC optical module. Correspondingly, a waveguide core coupled with the first PD 21 is arranged as a straight waveguide core, and the straight waveguide core is perpendicular to the cross section of the PLC chip 1. Therefore, a distance that the first PD 21 deviates from the first LD 51 is increased, to make the first PD 21 away from a direct radiating direction of the first LD 51, thereby further reducing the crosstalk.

Embodiment 3

Figure 5:
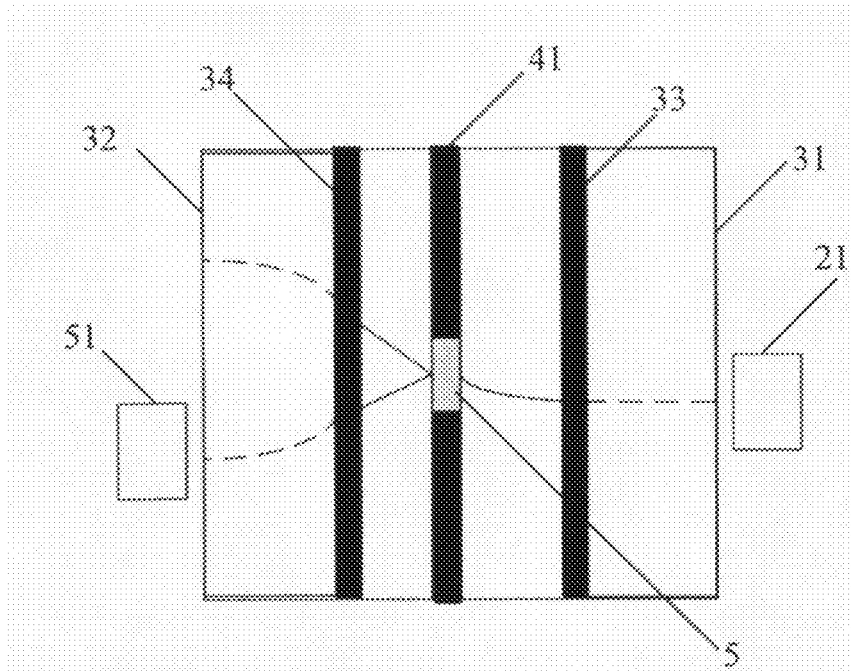
FIG. 5 is a schematic plan view of a PLC optical module according to Embodiment 3 of the present invention.
Figure 6:
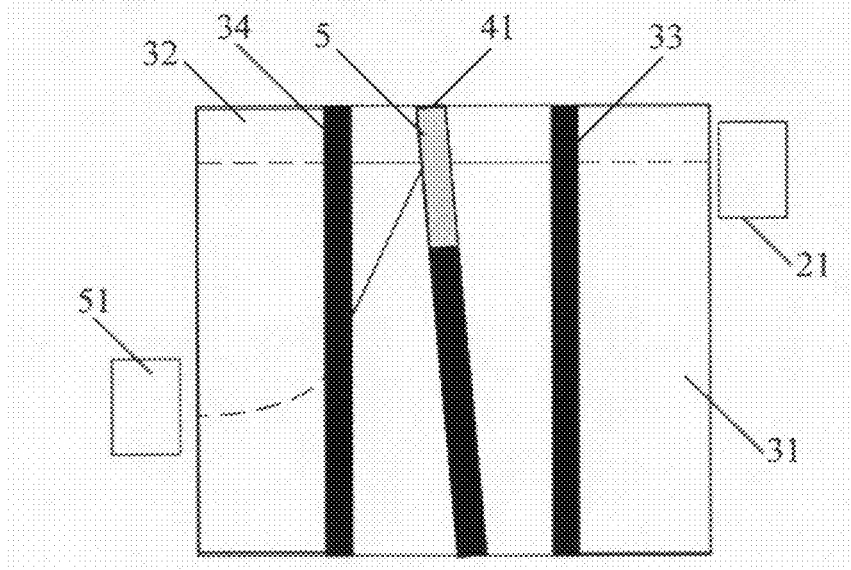
FIG. 6 is another schematic plan view of the PLC optical module according to Embodiment 3 of the present invention.

As shown in FIGS. 5 and 6, the first dividing groove in FIG. 5 is parallel to the cross section of the PLC chip, and the first dividing groove in FIG. 6 obliquely intersects with the cross section of the PLC chip. The difference from Embodiments 1 and 2 lies in that in this embodiment, the upper cladding, which is close to the first LD 51, of the PLC chip 1 is covered by a second upper cover plate 32, and a light blocking material is arranged on a side 34 of the second upper cover plate 32 facing the first PD 21. In this way, stray light entering the first LD 51 may be reduced, and the first LD 51 is enabled to operate stably. Usually, the second upper cover plate 32 has the same structure with the first upper cover plate 31.

Embodiment 4

Figure 7:
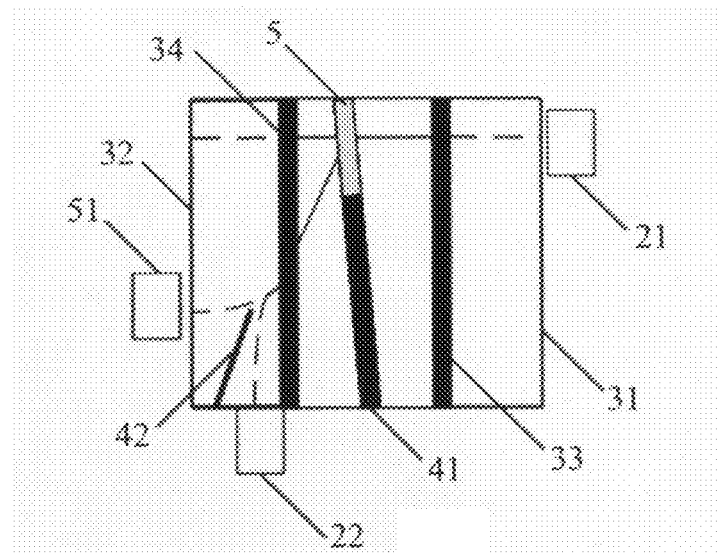
FIG. 7 is a schematic plan view of a PLC optical module according to Embodiment 4 of the present invention.

As shown in FIG. 7, the difference from Embodiment 3 lies in that the PLC optical module provided in this embodiment further includes a second PD 22 close to the first LD 51, and an optical axis of the second PD 22 is perpendicular to an optical axis of the first LD 51. Since certain back scattering and reflection may be generated after light sent by the first LD 51 enters the optical network through reflection of the WDM 5, and optical signals which are back scattered and reflected may reflect a condition of the network, the second PD 22 herein is used to receive this part of optical signals, so as to monitor the optical network accessed by the PLC optical module. Similarly, for the purpose of reducing crosstalk generated by the first LD 51 for the second PD 22, a second dividing groove 42 is added between optical waveguide of the second PD 22 and the first LD 51, and black adhesive or another light blocking material is filled therein, to block stray light that enters the second PD 22 from the first LD 51. In addition, the second dividing groove 42 runs through the second upper cover plate 32, the upper cladding 14, the sandwich layer 13, the lower cladding 12, and the base 11 from top to bottom to the upper surface of the lower cover plate 2. In this way, the effect of reducing the crosstalk is better.

For ease of designing and manufacturing the PLC optical module, a waveguide core coupled with the first LD 51 intersects with a waveguide core coupled with the second PD 22, and an intersection point thereof is located inside the second upper cover plate 32 and is close to the side 34 of the second upper cover plate 32 facing the first PD 21. In addition, the second dividing groove 42 further obliquely intersects with the cross section of the PLC chip 1, and a side end thereof is close to the intersection point.

Embodiment 5

Figure 8:
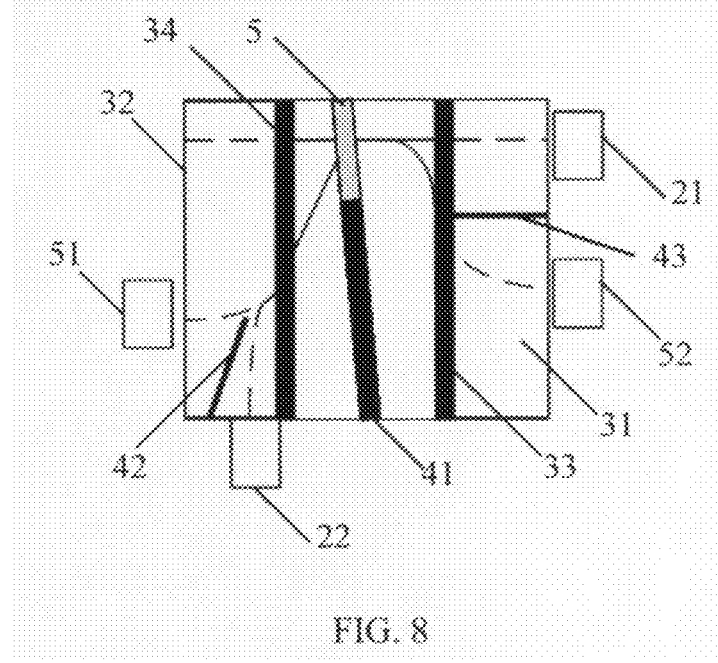
FIG. 8 is a schematic plan view of a PLC optical module according to Embodiment 5 of the present invention.

As shown in FIG. 8, the difference from Embodiment 4 lies in that the PLC optical module provided in this embodiment further includes a second LD 52. The second LD 52 and the first PD 21 are located at a same side end of the PLC chip 1, and both optical axes are parallel to each other. A wavelength of a test signal transmitted by the second LD 52 is different from a wavelength of a test signal transmitted by the first LD 51, where the specific test principle is similar to that of the first LD 51 and second PD 22 in Embodiment 4. Since scattering properties of different wavelengths in the optical network are different, advantages of signals of different wavelengths are taken to monitor different situations in the network, to perfect the network detecting function. Similarly, for the purpose of reducing crosstalk generated by the second LD 52 for the first PD 21, a third dividing groove 43 is added between optical waveguide of the second LD 52 and the first PD 21, and black adhesive or another light blocking material is filled therein, to block stray light that enters the first PD 21 from the second LD 52. In addition, the third dividing groove 43 runs through the first upper cover plate 31, the upper cladding 14, the sandwich layer 13, the lower cladding 12, and the base 11 from top to bottom to the upper surface of the lower cover plate 2. In this way, the effect of reducing the crosstalk is better.

In this embodiment, for ease of designing and manufacturing the PLC optical module, a waveguide core coupled with the first PD 21 intersects with a waveguide core coupled with the second LD 52, and an intersection point thereof is located outside the first upper cover plate 31. In addition, the third dividing groove 43 is perpendicular to the cross section of the PLC chip 1. It should be noted that the lower cover plate 2 should be enlarged herein, or a manner of active coupling glue and passive coupling paster is adopted, so as to arrange each LD and PD on the lower cover plate 2 and connect each LD and PD with the PLC module.

Embodiment 6

Figure 9:
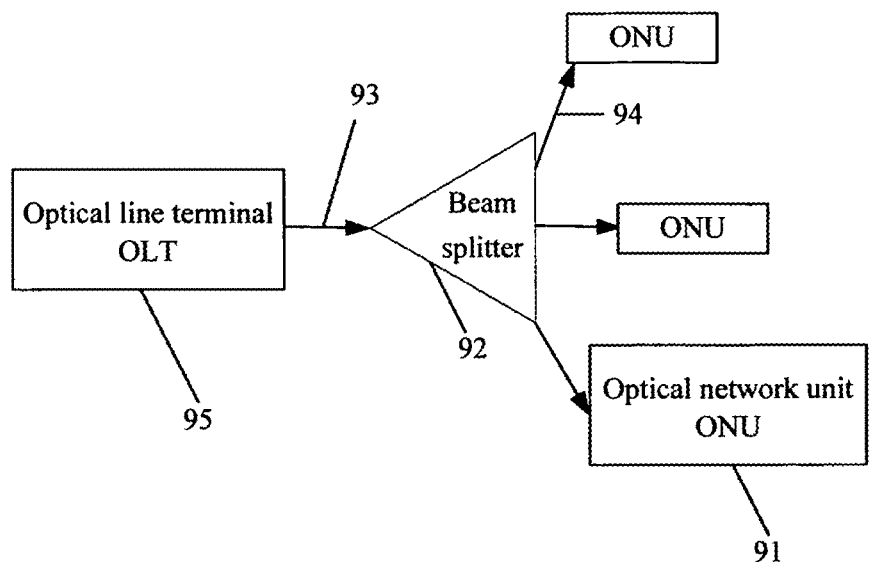
FIG. 9 is a schematic structural diagram of an optical network system according to Embodiment 6 of the present invention.

As shown in FIG. 9, FIG. 9 is a schematic structural diagram of an optical network system according to an embodiment of the present invention. Specifically, the optical network system includes an optical line terminal (OLT), a beam splitter (Splitter), and an optical network unit (ONU) 91. The beam splitter 92 and a trunk optical fiber 93 constitute an optical distribution network (ODN). Multiple optical network units 91 are connected to the beam splitter 92 through optical fibers 94, and are connected to the optical line terminal 95 (local side) through the trunk optical fiber 93 after convergence. The optical network units 91 share the trunk optical fiber 93 in a TDMA manner.

Further, the optical line terminal 95 includes the optical module according to Embodiments 1-5.

Furthermore, the optical network unit 91 includes the optical module according to Embodiments 1-5.

In the optical module, the first chip is arranged on the lower cover plate, and the upper cladding, which is close to the first PD, of the first chip is covered by the first upper cover plate. The first dividing groove divides the first chip into two parts, and the WDM and the light blocking material are arranged inside the first dividing groove, so as to block stray light transmitted inside the upper cladding, the sandwich layer, the lower cladding, and the base of the first chip, and the light blocking material is arranged on the side of the first upper cover plate facing the first LD, so as to block stray light transmitted on a surface of the first chip, thereby blocking the stray light that enters the first PD, and significantly reducing crosstalk of the optical module. Further, the PLC optical module has a simple structure, and therefore is easy to manufacture at a low cost. The description of Embodiments 1-5 may be referred to for the specific structure and corresponding description of the optical module, and details are not provided herein again.

The foregoing descriptions are merely exemplary embodiments of the present invention, but are not intended to limit the present invention. Any modifications, equivalent replacements, and improvements made within the spirit and principle of the present invention shall fall within the protection scope of the present invention.

What is claimed is:
1. An optical module, comprising:
   a first chip comprising a base, a lower cladding, a sandwich layer having multiple waveguide cores, and an upper cladding;
   a first laser diode (LD);
   a first photo diode (PD) arranged opposite to the first LD;
   a second PD close to the first LD, wherein an optical axis of the second PD is perpendicular to an optical axis of the first LD;
   wherein the first chip is arranged on a lower cover plate through the base, a portion of the upper cladding close to the first PD is covered by a first upper cover plate, and a portion of the upper cladding close to the first LD of the chip is covered by a second upper cover plate;
   wherein the first chip is divided into two parts by a first dividing groove that obliquely intersects with a cross section of the first chip, and a wavelength division multiplexer (WDM) and a first light blocking material are arranged inside the first dividing groove, so that the WDM is arranged at a side end of the first dividing groove and the remaining part of the first dividing groove is filled with the first light blocking material;

wherein a second light blocking material is arranged on a side of the first upper cover plate facing the first LD, a first waveguide core coupled with the first PD is a straight waveguide core perpendicular to the cross section of the first chip;

wherein a third light blocking material is arranged on a side of the second upper cover plate facing the first PD; and wherein a second dividing groove filled with a fourth light blocking material is arranged between the second PD and the first LD, and the second dividing groove runs through the second upper cover, the upper cladding, the sandwich layer, the lower cladding, and the base from top to bottom, to an upper surface of the lower cover plate.

2. The optical module according to claim 1, wherein the first dividing groove cuts through the upper cladding, the sandwich layer, the lower cladding, and the base, to an upper surface of the lower cover plate.

3. The optical module according to claim 1, wherein:
a second waveguide core coupling with the first LD intersects with a third waveguide core coupling with the second PD, and an intersection point thereof is located inside the second upper cover plate and is close to a side of the second upper cover plate facing the first PD; and
the second dividing groove obliquely intersects with the cross section of the first chip, and a side end thereof is close to the intersection point.

4. The optical module according to claim 1, wherein:
the optical module further comprises a second LD, the second LD and the first PD are located at a same side end of the first chip, and both optical axes are parallel to each other; and
a third dividing groove filled with a fifth light blocking material is arranged between the second LD and the first PD, and the third dividing groove runs through the first upper cover plate, the upper cladding, the sandwich layer, the lower cladding, and the base from top to bottom, to the upper surface of the lower cover plate.

5. The optical module according to claim 4, wherein:
the first waveguide core coupling with the first PD intersects with a fourth waveguide core coupling with the second LD, and an intersection point thereof is located outside the first upper cover plate; and
the third dividing groove is perpendicular to the cross section of the first chip.

6. An optical network system, comprising:
an optical line terminal, an optical distribution network, and optical network units, wherein:
the optical line terminal is connected to each optical network unit through the optical distribution network;
the optical line terminal and/or the optical network unit adopts an optical module comprising a first chip, a first laser diode (LD), a first photo diode (PD) arranged opposite to the first LD, and a second PD close to the first LD, wherein an optical axis of the second PD is perpendicular to an optical axis of the first LD;
the first chip comprises a base, a lower cladding, a sandwich layer having multiple waveguide cores, and an upper cladding;
the first chip is arranged on a lower cover plate through the base, a portion of the upper cladding close to the first PD is covered by a first upper cover plate, and a portion of the upper cladding close to the first LD of the chip is covered by a second upper cover plate;

the first chip is divided into two parts by a first dividing groove that obliquely intersects with a cross section of the first chip, a wavelength division multiplexer (WDM) and a first light blocking material are arranged inside the first dividing groove, so that the WDM is arranged at a side end of the first dividing groove and the remaining part of the first dividing groove is filled with the first light blocking material;

a second light blocking material is arranged on a side of the first upper cover plate facing the first LD, a first waveguide core coupled with the first PD is a straight waveguide core perpendicular to the cross section of the first chip;

a third light blocking material is arranged on a side of the second upper cover plate facing the first PD; and a second dividing groove filled with a fourth light blocking material is arranged between the second PD and the first LD, and the second dividing groove runs through the second upper cover, the upper cladding, the sandwich layer, the lower cladding, and the base from top to bottom, to an upper surface of the lower cover plate.

7. The optical network system according to claim 6, wherein the first dividing groove cuts through the upper cladding, the sandwich layer, the lower cladding, and the base, to an upper surface of the lower cover plate.

8. The optical network system according to claim 6, wherein:
a second waveguide core coupling with the first LD intersects with a third waveguide core coupling with the second PD, and an intersection point thereof is located inside the second upper cover plate and is close to a side of the second upper cover plate facing the first PD; and
the second dividing groove obliquely intersects with the cross section of the first chip, and a side end thereof is close to the intersection point.

9. The optical network system according to claim 6, wherein:
the optical module further comprises a second LD, the second LD and the first PD are located at a same side end of the first chip, and both optical axes are parallel to each other; and
a third dividing groove filled with a fifth light blocking material is arranged between the second LD and the first PD, and the third dividing groove runs through the first upper cover plate, the upper cladding, the sandwich layer, the lower cladding, and the base from top to bottom, to the upper surface of the lower cover plate.

10. The optical network system according to claim 9, wherein:
the first waveguide core coupling with the first PD intersects with a fourth waveguide core coupling with the second LD, and an intersection point thereof is located outside the first upper cover plate; and
the third dividing groove is perpendicular to the cross section of the first chip.

* * * * *